Patented Jan. 20, 1925.

1,523,459

UNITED STATES PATENT OFFICE.

LESLIE T. SUTHERLAND, OF YONKERS, NEW YORK, ASSIGNOR TO CARBOLOID PRODUCTS CORPORATION, OF NEWARK, NEW JERSEY, A CORPORATION OF NEW JERSEY.

CONDENSATION PRODUCT AND PROCESS OF MAKING THE SAME.

No Drawing. Application filed May 5, 1922. Serial No. 558,783.

*To all whom it may concern:*

Be it known that I, LESLIE T. SUTHERLAND, a citizen of the United States, residing at Yonkers, in the county of Westchester, State of New York, have invented certain new and useful Improvements in Condensation Products and Processes of Making the Same, of which the following is a description, reference being had to the accompanying drawing and to figures of reference marked thereon.

My invention relates to compositions of matter, which are products resulting from the reactions between oxyaromatic alcohols and cyclic ethers of polyhydric alcohols, and to the processes of making the same.

Oxyaromatic alcohols are well known, as are various processes of making them. These are described by Baeyer. B, 1872 p. 1094, Manasse, B, 27, 1894, p. 2409 continued and elaborated on the work of Baeyer.

Cyclic ethers of the polyhydric alcohols are also well known, as are the processes of making them. These ethers are described in the Annalen 289, p. 29; Annalen 335, p. 209; Berichte B, 27 p. 1536, B, 28, p. 1169.

The final reaction product may, if desired, be completed in one step; or it may be practiced in a series of steps, each step being incomplete in itself, either with or without the interjection of manipulative or other steps therebetween; and I generally prefer to have the multi-step process consist of two steps, the former of which is for the purpose of causing a partial reaction to produce a material that may be manipulated, and the latter of which is for the purpose of curing the material thereafter. However, the process may comprise as many steps or stages as may be found desirable.

My products, both the various intermediate and the final products, have the desirable characteristics of phenolic condensation products, but differ therefrom in that they have, to a greater or less degree, highly desirable characteristics which it has been impossible to impart to the above mentioned well known compositions. For example, it is not practical to make phenol-aldehyde condensation products so thinly fluid that they may be used alone, without a thinning solvent therefor, for the impregnation of porous articles having fine pores, such for example, as wood. In other words, high penetration of the article to be impregnated is not obtainable with phenol-aldehyde condensation products unless a thinning solvent be used; and the use of such a solvent which is generally removed by evaporation, is attended with the great disadvantage that the impregnation of the article as finally prepared is not complete, due to the voids present caused by the removal of the solvent.

My products on the other hand may be prepared in such a thinly fluid condition that when desired they may be used for the impregnation of porous materials or articles having fine pores, without the necessity of thinning them with solvents, which are later to be removed. Accordingly, complete impregnation of such articles or materials may be obtained by the use of my products.

Furthermore, I can produce a final, infusible insoluble product, by sufficient curing under proper conditions, which is generally done also in the case of the well known phenol-aldehyde and like condensation products; and I can control the hardness and flexibility of the same to the extent of producing finished articles which may be bent almost double without breaking; which is a distinct advantage over previously known products.

Another very advantageous feature of my invention is that my product may be cured into their final insoluble, infusible state by the mere application of heat, without the necessity of subjecting the material to pressure, although pressure may be used when desired, either in the one stage process wherein the final product is made in one step or operation from the combination of the oxyaromatic alcohol and the cyclic ether of a polyhydric alcohol, or in a multi-stage process acording to which I produe an intermediate product or products.

Briefly stated, my invention comprises making a condensation product, either intermediate or final, as may be desired, by combining or condensing an oxyaromatic alcohol, such as Oxybenzyl alcohol
Oxymethylbenzyl alcohol
Oxybetanaphtholbenzyl alcohol
Trihydroxybenzyl alcohol
Trihydroxycarboxylbenzyl alcohol as well as a great many other alcohols, with a cyclic ether of a polyhydric alcohol such as Formalglycerol
Formalglycols Acetalglycerol
Acetalgiycols
Benzalglycerol
Benzalglycols as well as a great many other compounds of this type; in the presence of a suitable condensing agent, either acid or alkaline, such for example, as formic acid, hydrochloric acid, phosphoric acid, sodium hydroxide, calcium hydroxide, ammonium hydroxide, sodium carbonate, ammonium carbonate, etc.

The characteristics of the product will be affected by the particular oxyaromatic alcohol used as well as by the particular cyclic ether and the particular condensing agent used, as well as, somewhat, by the other reaction conditions; and by a proper choice of these, I can produce a series of final products ranging from hard brittle through semi-rigid to extremely flexible, and even to a viscous liquid at normal temperature; and I can produce products varying anywhere from opaque to highly transparent substances.

A great many combinations of the reagents, that is of a particular alcohol on the one hand and a particular ether on the other, are possible, resulting in producing different characteristics in the final products; and I give the following combinations by way of examples but not as indicating the limits of the invention:

Ortho-oxybenzyl alcohol and formalglycerol

Ortho-oxybenzyl alcohol and acetalglycerol

Ortho-oxybenzyl alcohol and benzalglycerol

Oxybenzylmethylene alcohol and acetalglycerol

Ortho-oxybenzyl alcohol and formal and acetalglycerol

Oxybenzylphenylene alcohol and benzalglycerol

Oxybenzylphenylene alcohol and formalglycerol

Trihydroxycarboxylbenzyl alcohol and formalglycerol;

as well as many others. The ethers of other polyhydric alcohols may be used in place of glycerol, such as the glycols, as well as others; for example, erithrol.

It may sometimes be desirable to have several of the oxyaromatic alcohols or several of the cyclic ethers, or several of both reagents enter into the reaction, and a desired variation of characteristics may be obtained by a proper choice thereof.

The following examples will serve to illustrate my invention:

Example I

Mix together 93 parts by weight of ortho-oxybenzyl alcohol $C_6H_4OHCH_2OH$, 7 parts by weight of formalglycerol $CH_2OCH_2CHOCH_2OH$, and 3.5 parts by weight of 30% ammonium hydrate or its equivalent of $NH_3$. Put this mixture in a covered apparatus which is preferably fitted with a stirring device and a reflux condenser open to the atmosphere, and heat to about 70° C. whereupon condensation will start immediately; it should be allowed to continue slowly so that the heat generated by the reaction will not cause the temperature to rise rapidly. After continuing at this temperature of about 70° C. for two or three hours the partially condensed liquid product may be poured into open vessels and the heating continued, gradually increasing the temperature to 100° C. When the product becomes a solid, the temperature may be increased rapidly to about 125° C. and maintained thereat until the product is fully condensed or cured. The time necessary for complete curing depends wholly on the temperature employed and on the thickness and the mass of the material being cured.

The final product obtained from the foregoing is a light yellow transparent semi-rigid amber like solid, very flexible when heated, infusible, insoluble in all ordinary solvents, highly resistant to acids and many alkalies, and possesses high dielectric qualities.

Example II

Mix together 50 parts by weight of ortho-oxybenzyl alcohol $C_6H_4OHCH_2OH$, 50 parts by weight of formalglycerol $CH_2OCH_2CHOCH_2OH$, and 3.5 parts of 30% ammonium hydrate, or its equivalent in $NH_3$; and proceed exactly as in Example I. The final product obtained from this mixture is very similar to the one obtained in Example I except that it is very much more flexible at ordinary temperatures, and still more so when heated.

Example III

Mix together 100 parts by weight of ortho-oxybenzyl alcohol $C_6H_4OHCH_2OH$, 25 parts by weight of acetal-glycerol $HOC_3H_5O_2CHCH_3$, and 9 parts by weight of 30% ammonium hydrate and proceed as in Example I.

The final product obtained is a brilliant clear yellow transparent solid, very similar to, and possessing all the characteristics of, the one made as per Example I.

Example IV

Mix together 100 parts by weight of ortho-oxybenzyl alcohol $C_6H_4OHCH_2OH$, 25 parts of benzal-glycerol $HOC_3H_5O_2CHC_6H_5$, and 9 parts, by weight, of 30% ammonium hydrate, and proceed as in Example I.

The final product obtained is a very brilliant clear yellow transparent solid with all the characteristics of the one made as per Example I.

*Example V*

Mix together 100 parts, by weight, of oxybenzylmethylene alcohol $C_6H_4OHCH_2CH_2OH$, 25 parts by weight of acetal-glycerol $HOC_3H_5O_2CHCH_3$, and 2 parts by weight of concentrated hydrochloric acid, and proceed as in Example I.

The final product obtained is a deep reddish brown resinous solid that is brittle at ordinary temperatures and a thick viscous liquid at about 90° C. It is insoluble in all the ordinary solvents and resists to a considerable degree the action of acids and alkalies.

*Example VI*

Mix together 75 parts by weight of ortho-oxybenzyl alcohol $C_6H_4OHCH_2OH$, 25 parts by weight of acetalglycerol $HOC_3H_5O_2CHCH_3$, 25 parts by weight of formal-glycerol $CH_2OCH_2CHOCH_2OH$, and 9 parts by weight of 30% ammonium hydrate, and proceed as in Example I.

The final product obtained is a clear bright yellow semi-rigid solid at ordinary temperatures which becomes extremely flexible when heated, and it has all the other characteristics of the product of Example I.

*Example VII*

Mix together 34 parts by weight of oxyphenlybenzyl alcohol $C_6H_4OHC_6H_4CH_2OH$, 10 parts by weight of benzal-glycerol $HOC_3H_5O_2CHC_6H_5$, and 5½ parts by weight of 30% ammonium hydrate, and proceed as in Example I.

The final products obtained is a brownish yellow resin at ordinary temperatures and a thick jelly like substance when heated. It is insoluble in all ordinary solvents and resists acids and alkalies to a considerable degree.

*Example VIII*

Mix together 40 parts by weight of oxyphenylbenzyl alchol $C_6H_4OHC_6H_4CH_2OH$, 10 parts by weight of formal-glycerol $CH_2OCH_2CHOCH_2OH$, and 2½ parts of 30% ammonium hydrate, and proceed as in Example I.

The final product obtained is a brownish red, extremely flexible solid at ordinary temperatures and a thick rubbery substance when heated. It is infusible and insoluble in all ordinary solvents and resists acids and alkalies to a considerable degree.

*Example IX*

Mix together 118 parts by weight of trihydroxybenzyl alchohol $C_6H_2(OH)_3CH_2OH$, 24 parts by weight of formal-glycerol $CH_2OCH_2CHOCH_2OH$, and 10 parts by weight of 30% of ammonium hydrate, and proceed as in Example I.

The final products obtained is a brick red brittle resin, insoluble in all ordinary solvents. Increasing the amount of the formal-glycerol to 100 parts by weight produces a brick red resinous final product that is flexible at ordinary temperatures, the flexibility increasing when heated. It is insoluble in all ordinary solvents.

*Example X*

Mix together 112 parts, by weight, of tri-hydroxycarboxylbenzyl alcohol $C_6HCOOH(OH)_3CH_2OH$, 16 parts by weight of formal-glycerol $CH_2OCH_2CHOCH_2OH$, and 10 parts by weight of 30% ammonium hydrate, and proceed as Example I, except that the temperature should be maintained below 70° C. to allow the reaction to proceed slowly.

The final product obtained is a clear brown brittle resin at ordinary temperatures and a stiff rubbery jelly when heated, and it is insoluble in all ordinary solvents.

All the above example illustrate the one step process whereby the final products are obtained in one operation, but I do not intend that my invention shall be limited thereto as it is frequently desirable to interrupt the reaction when materials having suitable characteristics (intermediate products) have been obtained and thereafter to proceed with the condensation reaction as may be best suited to industrial purposes.

Innumerable combinations of various oxyaromatic alcohols with various cyclic ethers of the polyhydric alcohol may be used, of which the examples given above are merely illustrative. A number of oxyaromatic alcohols not specifically named herein may be substituted in the above examples for those therein named; and a number of cyclic ethers of other polyhydric alchohols than glycerol may be used. The glycols such as ethylene glycol, propylene glycol, butylene glycol, amylene glycol, etc., may be used with good results in the preparation of the cyclic ether with the aldehyde, as may erithrol: the use of the glycols as a rule resulting in final products having about the same characteristics as is obtained with the use of the cyclic ether of glycerol, but when used in the same ratio as the glycerol compounds the final products obtained from the ethers of the glycols are slightly more rigid.

The ratio of the amount of the cyclic ether of the polyhydric alcohol to the amount of the oxyaromatic alcohol used may be varied within extremely wide limits; and it may be stated as a general rule that an increase of the ratio of the amount of the ether to the amount of the oxyaromatic alchol will result in increased flexibility of the final product, and vice versa.

The proportions of the condensing agents used as given in the above examples, may be varied within rather wide limits, and amounts from 50% below to 50% above the amounts given in such examples may be used with good results.. It is not essential that the particular condensing agent specified in each of the examples be used therein, as others, among which are those referred to above, may be used in place thereof, but as a rule I prefer to use ammonia as it tends to give clearer final products.

One of the important advantages of the use of the reagents referred to above for the production of plastic bodies is that the various mixtures thereof, that is the various mixtures of oxyaromatic alcohols and the cyclic ethers of the polyhydric alcohols will not condense or cure at atmospheric pressure even if heated, in the absence of a condensing agent. The reagent may therefore be mixed together and stored for very long periods of time after which they are still in condition for use; and to use them it is only necessary to intermix the condensing agent therewith and subject the mixture to heat. The mixtures are thin liquids and remain so until it is desired to condense or thicken them and they are therefore particularly adapted, without the use of any solvents, to the impregnation of porous articles or materials such as wood, paper, fabric, etc., or they may be mixed with any of the well known fillers such for example, as wood flour, cork, asbestos, cotton or wood fabric, metal-oxides, chalk, earthy substances, etc., to form molding compounds which, may be molded into predesired shapes and thereafter cured to the final state by the application of heat either with or without subjection thereof to pressure in the molds. Pressure may be used if desired but it is not essential.

I may also cause or permit a slight pre-condensation of the mixture. For example, I may add a very small amount of condensing agent to the mixture, say in the proportion of about 1 to 1000. Such a mixture, while it will condense to some extent, will not harden in storage, and a further addition thereto of condensing agent may be made when further condensation is desired.

The condensation reaction according to which my products are formed does not take place in distinct steps but is of a continuous, ever changing nature, and the reaction may be made to take place in as many steps or stages as may be desirable for industrial purposes. Useful intermediate products may be obtained by causing condensation to take place at a temperature of from 50° C. to 70° C. for from one to four hours. Such partial condensation products are soluble, and may be dissolved in a suitable solvent such as ethyl, methyl or denatured alcohol nitrobenzene, etc., to a concentration suitable for use as a varnish or lacquer, the curing of which into the final stage being accomplished by heat either with or without the application of pressure, after evaporation of the solvent.

Coloring matter may be added to my materials at any suitable stage before they are finally cured; that is they may be added to the reaction mixture, or to the partially condensed products of such mixtures alone or when they are mixed with other substances, or when in solution. Dyes and pigments such as ruby red, acetal red, aurine red, ultramarine, methyl blue, methyl or chrome green, nigrosine carbon or lamp black as well as many others may be used.

The method of producing my final products by the multi-stage process, a two step process being taken as an example, is as follows:

The oxyaromatic polyhydric alcohol compounds are mixed in suitable proportions, depending upon the characteristics of the final product desired, by stirring together, and the condensing agent is then mixed in. This mixture may be used as it is or it may be heated at a temperature of 60°–70° C. for a short time, say one to three hours to partially condense the mixture and then cooled to ordinary temperature. This heating is not necessary in all cases but is sometimes advantageous as it lessens the time of curing the final product.

The mixture, with the condensing agent added, as well as the partially condensed compound, is a thin liquid with a specific gravity of from about 1,100 to 1,180 depending on the treatment. This intermediate product may then be used without the application of heat or a solvent to impregnate all materials having no cellular structure, or of textile fabrics, or substances of a porous nature, and after the impregnation the articles may be placed in heating chambers and cured at suitable temperatures without external pressure, or they may be put into suitable moulds under pressure and cured to the final state.

The surface of wood treated as above can be given a very high polish either by hand or with buffing wheels and, being non-absorbent, acid resisting, and insoluble in the ordinary solvents produces a valuable article of manufacture.

Furthermore, the intermediate product may be mixed by suitable well known means with many substances such as wood flour, asbestos, cork, cotton or wool fibres, silica, inert earths, etc., to form moulding mixtures, the liquid condensation product acting as the binder and the other substances as filler. These mixtures may then be pressed into shapes in suitable moulds and with the application of heat converted into insoluble, flexible, infusible or hard solids either with or without the application of pressure.

Almost any degree of flexibility may be obtained in the final product, ranging from a thick jelly-like mass to a semi-rigid transparent shell-like solid, or a hard brittle opaque solid, both infusible and insoluble, depending upon the particular combination of the oxyaromatic compound and the cyclic ether of the polyhydric alcohol used, and also on the ratio of the amount of the polyhydric to the oxyaromatic alcohol.

The temperature used in curing the various compounds depends entirely on the method of preparation used, that is, whether the one-step process is used or whether an intermediate product is used for impregnating articles for mixing with substances to form moulding mixtures and also on whether curing takes place with application of external pretssure or at atmospheric pressure. In general the heat should be applied gradually, starting in some instances as low as 50° C. and gradually increasing until condensation is complete, in others the temperature may be started at 90° to 100° C, and if external pressure is used at higher temperatures even as high as 150° to 175° C.

The time of curing depends on the particular combination used and the temperature; the lower the temperature the longer the time necessary to effect the final cure, and vice versa. I have found this ranges from a few minutes, as with some moulding mixtures to several days, when curing clear transparent flexible blocks.

Articles that have been varnished or lacquered with my intermediate product should be allowed to stand in the air or gently heated to allow the solvent to be completely evaporated before being placed in the heating chambers to cure them. Sheets of paper, fabric or other varieties of sheet material, may be impregnated, surface coated, or immersed in my intermediate product. They may then be passed through calendar or other rolls to remove the excess of applied compound; and the individual sheets may then be cured to the final state, or a number of such sheets may be pressed together in suitable moulds and so cured, thus forming sheet material having great strength, flexibility and resistance to chemicals, or they may be made as hard and inflexible as desired.

The final products obtained by my invention may be hard and brittle or they may be strong flexible products at ordinary temperatures, the flexibility increasing very much on heating them. They are insoluble in the ordinary solvents and are infusible, that is, they cannot be liquified by heat. They may be carbonized with sufficient heat, but burn in a flame very slowly, and they are therefore very poor supporters of combustion. They are also resistant to a great many chemicals.

Liquids, which may be either the liquid reaction mixture before any condensation has taken place or the thin liquid resulting from partial condensation may be used for impregnating materials having more or less fine pores, and I am able to either fill the pores completely so that they will remain filled after curing, or I can easily control the degree to which I desire to fill them, for I can coat the inner walls of the pores to any desired thickness by impregnating the porous material with a solution of my thin liquid in a suitable solvent, the quantity of solvent to solute depending upon the thickness of the coating desired, relatively more solvent being used for relatively thinner coating. I usually prefer to remove the moisture, air and other fluids present in the cells before impregnating, particularly in the case of wood.

The final product obtained by either the one or two stage process is exactly the same in so far as the condensation product itself is concerned. In fact it is immaterial in how many stages this process may be carried out, but the advantages of the two or other multi-stage process is that manipulative steps may be interposed after the beginning and before the end of the condensation or curing.

As a general rule, varying results are obtained by using different condensing agents, and the degree of condensation may be further controlled by varying the time and temperature of condensing or curing.

I may state as a general rule that any results obtained at any given temperature may also be obtained at a lower or higher temperature maintained respectively over a longer or shorter period of time.

For some purposes, products of a lower degree of condensation are desired, while for other purposes complete condensation is preferable.

Generally from 5% to 50% of the cyclic ether, based on the total mixture gives the best results, the lower amount resulting in a final product which is very rigid at normal temperatures, while the higher amount results in a final product having the consistency of a stiff jelly. The lower or higher limits given may, however, be sometimes exceeded.

In my copending applications filed of even date herewith, Serial Nos. 558,784 and 558,785, I claim, respectively, the impregnated material and process of making the same, and the process of making flexible articles.

Having thus described the invention, what is claimed as new is:—

1. The process which includes condensing an oxyaromatic alcohol and a cyclic ether of a polyhydric alcohol.

2. The process which comprises mixing an oxyaromatic alcohol, a cyclic ether of a polyhydric alcohol and a condensing agent, and subjecting the mixture to heat.

3. The process which comprises mixing an oxyaromatic alcohol, a cyclic ether of a polyhydric alcohol and a basic condensing agent, and subjecting the mixture to heat.

4. The process which comprises mixing oxyaromatic alcohols, a cyclic ether of a polyhydric alcohol and ammonia, and subjecting the mixture to heat.

5. The process which comprises mixing an oxyaromatic alcohol and a cyclic ether of polyhydric alcohol, allowing the mixture to stand until condensation is desired, and then adding a condensing agent.

6. The process which comprises mixing an oxyaromatic alcohol and a cyclic ether of a polyhydric alcohol, allowing the mixture to stand until condensation is desired, and then adding a basic condensing agent.

7. The process which comprises mixing an oxyaromatic alcohol and a cyclic ether of a polyhydric alcohol, allowing the mixture to stand until condensation is desired, and then adding ammonia.

8. The process which comprises mixing an oxyaromatic alcohol and a cyclic ether of polyhydric alcohol, allowing the mixture to stand until condensation is desired, and then adding a condensing agent, and subjecting the mixture to heat.

9. The process which comprises mixing an oxyaromatic alcohol and a cyclic ether of a polyhydric alcohol, allowing the mixture to stand until condensation is desired, and then adding a basic condensing agent and subjecting the mixture to heat.

10. The process which comprises mixing an oxyaromatic alcohol and a cyclic ether of a polyhydric alcohol, allowing the mixture to stand until condensation is desired, and then adding ammonia and subjecting the mixture to heat.

11. A composition of matter capable of being condensed to a condensation product of an oxyaromatic alcohol and a cyclic ether of a polyhydric alcohol.

12. A condensation product of an oxyaromatic alcohol and a cyclic ether of a polyhydric alcohol.

13. A thin fluid liquid composition of matter capable of being condensed to a condensation product of an oxyaromatic alcohol and a cyclic ether of a polyhydric alcohol.

14. A thinly fluid condensation product of an oxyaromatic alcohol and a cyclic ether of a polyhydric alcohol, choosing such an alcohol and such an ether as will produce the desired characteristics, and condensing a mixture thereof.

15. The process of making a condensation product of an oxyaromatic alcohol and a cyclic ether of a polyhydric alcohol having predesired physical characteristics, which comprises choosing such relative proportions of the alcohol and the ether as will produce the desired characteristics, a greater proportion of the ether producing a more flexible product, and a greater proportion of the alcohol producing a less flexible product, and then condensing a mixture thereof in such proportions.

16. The process of making a condensation product of an oxyaromatic alcohol and a cyclic ether of a polyhydric alcohol having predesired physical characteristics which comprises choosing such relative proportions of such an alcohol and such an ether as will produce the desired characteristics, a greater proportion of the ether producing a more flexible product, and a greater proportion of the alcohol producing a less flexible product, and condensing a mixture thereof in such proportions.

17. A final condensation product of an oxyaromatic alcohol and a cyclic ether of a polyhydric alcohol which is insoluble and flexible.

In testimony whereof, I affix my signature.

LESLIE T. SUTHERLAND.